Patented Mar. 5, 1935

1,992,979

UNITED STATES PATENT OFFICE 1,992,979

PURIFICATION OF OILS

Herbert J. Wollner, Westport, Conn., assignor to General Chemical Company, New York, N. Y., a corporation of New York No Drawing. Application November 19, 1930, Serial No. 496,832

8 Claims. (Cl. 87—12)

This invention is directed to a process for treating oils, and relates more particularly to a process for purifying, decolorizing, bleaching and clarifying mineral, vegetable and animal oils and fats by contacting such substances with an active silica.

Several processes for treating and purifying mineral, vegetable and animal oils and fats have been proposed. Such processes generally involve contacting the oils at some stage in the refining thereof with solid porous adsorbents and purifying agents of various chemical compositions and physical characteristics. The active adsorbents or decolorizers previously employed may be considered as falling within one of two general classes. The first of these includes earths which are found in their natural state in a condition ready for use. Fuller's earth and bauxite are two well known examples of this type of material. A second generic class, which may be regarded broadly as directed to artificial substances, includes acid treated clays, and gels of various kinds generated, as a rule, by processes involving reactions between soluble silicates and acids. Of the acid treated clays, several well known substances resulting from the acid treatment of bentonite and montmorillonite are representative, and gels, such as silica gel, are examples of the second type. There is a wide difference between the substances of each broad class, both with respect to initial cost and to their efficiency as decolorizing and purifying agents, and with respect to the cost of purification processes involving their use. Materials of the second class, although much more expensive than those of the first, are generally recognized as being the best known decolorizers and purifying agent. The present invention is directed to a process employing an active silica having a greater efficiency than known purifying and decolorizing agents of either the first or second classes, but yet of such nature that the initial cost of the active silica and the cost of purification processes involving the use of the same are greatly reduced.

Accordingly, the principal object of the invention lies in the provision of a process for treating oils, such as mineral, vegetable and animal oils and fats, and particularly mineral oils and animal oils and fats, whereby the oils are more thoroughly purified and decolorized than when treated according to prior processes. The invention further aims to provide a process which, notwithstanding the increased degree of purification, may be carried out at a cost materially less than prior processes.

Briefly, the invention comprises the treatment of oils of the kind referred to, and particularly of mineral oils and animal oils and fats, by contacting the oils with a white, fluffy powder-like active silica having properties and made by a process hereinafter described in detail.

A method of making the active silica employed in the present invention may be briefly described as follows: Where the silicious material employed as a source of silica is in the raw condition, i. e. substantially in the original form as mined and as a metal silicate, it is initially dried, crushed and calcined. Following calcination, the material is digested in a strong mineral acid, and the acid soluble constituents then separated from the silicious residue by washing. The silicious residue thus obtained is digested with the aid of heat in an alkaline solution in which the silica forming the active component of the adsorbent becomes dissolved. Solid undissolved residues are separated from the hot solution, and the active silica is subsequently precipitated from the alkaline solution in a manner hereinafter specified. The adsorbent thus formed is separated from the solution, and suitably dried. In other instances where the silicious material utilized as a source of silica is the by-product of a chemical process involving the acid treatment of a silicate and in which acid soluble substances have been separated and removed from the silica residue, the silicious by-product is directly subjected to digestion in the alkaline solution and to the subsequent treatment, the acid treatment being omitted provided the prior chemical processes have been such that the silicious product or by-product thereof is in suitable physical condition, as will be hereinafter specified, for the alkaline digestion.

One preferred method of making the active silica having reference for convenience to specific raw materials and operating conditions is as follows: In this example, the raw material utilized is a clay, substantially kaolinite, and composed approximately of alumina $(Al_2O_3)$, 40%; silica $(SiO_2)$, 45%; water $(H_2O)$, 13%; titania, iron oxides, alkalies, etc., balance.

The raw clay is first dried, crushed to a suitable degree of fineness, and then calcined at a temperature of approximately 650° C. Following calcination, the clay is cooled and ground. The finely ground calcined clay is then digested with 40% sulfuric acid for a period sufficient to facilitate the dissolution by the acid of substantially all the readily acid soluble substances. With this particular clay, a large proportion of alumina is liberated, taking the form of aluminum sulfate.

The aluminum sulfate and other acid soluble substances are then removed from the acid-treated clay by washing with water. After washing and drying the silicious clay residue remaining contains in the neighborhood of 70% silica, about 15% alumina, small quantities of titania, iron oxides, etc. as impurities.

The clay residue is then ground to such an extent that substantially all of the material passed a 300 mesh screen. A mixture comprising one part of ground clay residue to four parts of sodium carbonate as a 20% solution, i. e., 4 parts of sodium carbonate to 16 parts of water, is boiled for about one hour. During the digestion the silica forming the active component of the active silica becomes dissolved in the sodium carbonate solution.

On completion of the boiling for the period noted, the digested mass is filtered while the solution is maintained at not substantially less than the same elevated temperature as that of the digestion. During the alkaline digestion the clay residue is reduced approximately 50% by weight.

The clear filtrate remaining after digestion and separation of the mud from the solution while in the hot state apparently contains sodium silicate, sodium bicarbonate and sodium carbonate. At this stage while the filtrate is still hot, sodium bicarbonate, or carbon dioxide gas is added thereto in such quantities as to compensate for any carbon dioxide lost during digestion. After the addition of carbon dioxide, the filtrate is cooled to normal temperature. During cooling, the active silica forms and is precipitated from the solution as a white, flocculent gel. The gel is then filtered out of the solution, and subjected to washing with water to remove sodium carbonate. Subsequently, the gel is again washed with a weak acid to neutralize any sodium carbonate which may be retained after the water wash. The gel thus obtained is dried at a temperature of about 110° C. for approximately one hour, and is a white, fluffy powder having a specific gravity of approximately 0.2 and water of hydration of about 6 to 7½%, and contains in excess of 95% silica figured on an anhydrous basis.

In the initial acid digestion, any suitable acid such as sulfuric, hydrochloric or nitric acids or any acid strong enough to effect the removal of alumina may be employed. Calcination of the initial raw silicious material prior to the acid digestion while not essential is preferable to aid in the dissoluton of the raw material. The concentration of the sodium carbonate solution may be varied over a considerable range. It appears that dissolution of the active silica is more complete in a relatively concentrated solution, although such concentration may vary from less than 10 to about 24%. A potassium carbonate solution or a solution comprising a mixture of sodium and potassium carbonates of suitable concentration may be employed.

Where, as in the present instance, the active silica is to be used as an adsorbent or oil decolorizer, it is preferred to effect separation of the solution and the undissolved residue or mud while the solution is hot, and at a temperature not substantially less than that of digestion. It appears that under certain conditions, if a small quantity of insoluble matter is permitted to remain in the solution, the purifying and decolorizing properties of the gel product may be impaired.

The filtrate obtained on separation of the mud unattacked by the digestion with the carbonate is a clear solution, and apparently contains principally, while hot, sodium silicate ($Na_2SiO_3$), sodium bicarbonate ($NaHCO_3$), and sodium carbonate ($Na_2CO_3$). During the hot digestion of the silicious material in the carbonate solution, sodium bicarbonate is formed which, in the process of boiling, incurs a consequent loss of carbon dioxide. In order to effect the most efficient precipitation of active silica from the sodium silicate of the filtered carbonate solution, the addition thereto of carbon dioxide is desirable. In practice, the carbonate digestion may be carried out under such conditions that the carbon dioxide evolved is drawn off and conserved to be turned back into the hot filtered carbonate solution, in required amounts, just prior to or during cooling. In order to determine the carbon dioxide loss during digestion, a sample of the hot filtered carbonate solution on cooling may be tested for the presence of sodium silicate, and the carbon dioxide necessary to facilitate a complete precipitation of the silica therefrom may be determined. The required amount of carbon dioxide is then introduced into the hot carbonate solution as carbon dioxide gas, or in the form of sodium bicarbonate in sufficient quantities to furnish the necessary amount of carbon dioxide. In whatever form the carbon dioxide is added, the quantity thereof should preferably be sufficient to compensate for that lost during digestion, that is, the amount of carbon dioxide added should preferably be enough to convert the solution back to a sodium oxide to carbon dioxide molecular ratio of one to one.

On the addition of the carbon dioxide and subsequent cooling of the carbonate solution to normal temperature, the active silica separated from the silicious material by digestion in the carbonate solution, precipitates out as a white, flocculent gel. The formation of the gel starts shortly after cooling is initiated, and proceeds with a moderate degree of rapidity as the temperature of the solution drops. The extent of the period of time over which cooling takes place does not appear to have any material effect on the quality of the product, but it has been found that the longer the cooling, and the longer the solution is permitted to stand after cooling, the greater is the ease of subsequent filtration for the purpose of separation of the gel from the supernatant sodium carbonate solution.

After the filtration and removal of the gel from the solution, the latter, which has been substantially all transformed back to sodium carbonate on the replacement of carbon dioxide, is returned to the process and utilized in a subsequent carbonate digestion. The gel is subjected to one or more water washes to remove excess of sodium carbonate, and the wash water is likewise returned to the process. Following the water wash, the gel is washed with a weak acid to neutralize any sodium carbonate which may be retained after the water washing. The washed gel is then dried at a temperature of about 110° C. for approximately one hour. The product is a white, fluffy powder having an apparent specific gravity of about 0.2, water of hydration of approximately 6 to 7½% at 110° C., and a silica content of not less than 90% and usually in excess of 95%, figured on the anhydrous basis.

In the specific example given above, it will be observed that the raw material employed was a clay having the characteristics and approximate composition of kaolinite. The process of making the active silica is adaptable to utilize many different clay materials of this general type and other silicious materials, and contemplates the employment of materials which in either the raw or acid treated state may have little or no adsorbent and purifying properties, and mineral substances which in the raw state or when subjected to an acid treatment may have some more or less valuable properties as adsorbents and purifying agents.

The carbonate digestion and subsequent phases of the process of making the active silica are adaptable to utilize silicious residues of prior chemical treatments which serve to place the silicious material in similar chemical and physical condition as that acquired by residues resulting from the acid treatment of clays. The product recovery of the process and the quality of the active silica seems to depend, to some extent, on the degree of subdivision, and other conditions not altogether apparent, of the silicious material just prior to digestion in the carbonate solution. In general, the carbonate digestion phase of the process described is particularly adaptable to the treatment of silicious material containing uncombined silica, whether in a natural state or the residue of a prior chemical process. Any silicious residue of a prior chemical process. Any silicious material resulting from chemical processes, the primary object of which is the extraction of substances other than silica, particularly fulfill the requirements of the invention as to silicious material for the carbonate digestion. However, a most satisfactory active silica is obtained from the silicious residue resulting from the treatment of silicates with an acid.

Although any suitable method for bringing the oil into intimate contact with the active silica may be employed, it has been found that on account of certain physical characteristics of the active silica, the so-called contact method is preferred, although the percolation method may be utilized if desired. According to the contact method, the finely divided active silica described is introduced into the oil to be treated, and the mixture is agitated by suitable means for a sufficient period of time to permit extraction of impurities from the oil. The mixture is then filtered, yielding a clear oil. Revivification may be effected by one or more washings of the spent silica with a suitable solvent for the particular oil being treated with the active silica. Subsequent to the washing steps, the silica may be calcined at temperatures, preferably not exceeding 650° C. to burn out occluded carbonaceous matter and completely return the silica to its initial condition.

Where the oil being treated according to the invention is a light oil, the process may readily be carried out at normal or slightly elevated temperatures. In instances where it is desired to treat a heavy oil or greases and fats, temperatures are preferably high enough to maintain the oils and fats in fluid condition. For example, in the treatment of animal fats which are in a solid or pasty condition at normal temperatures, satisfactory results have been obtained at temperatures ranging from about 125° to about 200° F.

Tests conducted by standard methods show that oils, particularly mineral oils and animal oils and fats treated according to the present invention are more thoroughly purified and decolorized than where the same oils are similarly treated with other well known acid treated clays and gels now obtainable on the market. Inasmuch as the purifying and decolorizing properties of the present active silica are decidedly superior to those of known substances, smaller quantities of active silica may be employed in purification processes, and equal or better results obtained. It is accordingly apparent that further economies are effected by reason of the smaller quantities of oil absorbed and retained in the spent silica, and the consequent reduction in cost of revivification.

In the appended claims, the term "oil" is intended to include oils which are liquid at normal temperatures, and fats and greases which are in a solid or pasty condition at normal temperatures but are liquids at more or less elevated temperatures, and solutions of oils and fats in suitable solvents.

I claim:
1. The method of treating an oil which comprises contacting the oil with an active silica of low apparent specific gravity, containing a predominating amount of silica, and prepared by digesting material containing a substantial amount of silica in an alkaline solution capable of dissolving silica forming an active component of the active silica, precipitating from the solution silica dissolved thereby, and separating the precipitated silica from the solution.

2. The method of treating an oil which comprises contacting the oil with an active silica of low apparent specific gravity, containing a predominating amount of silica, and prepared by digesting material containing a substantial amount of silica in a hot alkaline solution capable of dissolving silica forming an active component of the active silica, separating solid residue from the solution, and cooling the solution to form a silicious precipitate.

3. The method of treating an oil which comprises contacting the oil with an active silica of low apparent specific gravity, containing a predominating amount of silica, and prepared by digesting clay in a relatively strong acid solution, separating the solid residue containing a substantial amount of silica from the acid soluble substances, digesting the residue in an alkaline solution capable of dissolving silica forming an active component of the active silica, and precipitating silica from the solution.

4. The method of treating an oil which comprises contacting the oil with an active silica of low apparent specific gravity, containing a predominating amount of silica, and prepared by digesting clay in a relatively strong acid solution, separating the solid residue containing a substantial amount of silica from the acid soluble substances, digesting the residue in a hot alkali carbonate solution, separating solid residue from the solution while maintaining the latter at an elevated temperature, treating the solution with carbon dioxide, cooling the solution to form a silicious precipitate, and separating the precipitate from the solution.

5. The method of treating a mineral oil which comprises contacting the oil with an active silica of low apparent specific gravity, containing a predominating amount of silica, and prepared by digesting calcined clay in a strong mineral acid solution, separating the silicious residue containing a substantial amount of silica from the acid soluble substances by washing with water, digesting the residue in a hot sodium carbonate solution to dissolve silica forming an active component of the active silica, separating the solid residue from the solution while maintaining the latter at an elevated temperature, treating the solution with carbon dioxide, cooling the solution to form a silicious precipitate, separating the precipitate from the solution, and drying the precipitate.

6. The method of treating an oil which comprises contacting the oil with a relatively finely divided active silica of low apparent specific gravity, containing not less than about 90% silica on anhydrous basis and a substantial amount of water of hydration, said active silica being prepared by digesting the solid siliceous residue of acid treated clay in a hot alkaline solution of such concentration as to be capable of extracting silica from the solid residue thereby dissolving silica, separating solid undissolved residue from the solution, precipitating silica from the solution, and separating the silica therefrom.

7. The method of purifying an oil which comprises contacting the oil with a finely divided active silica of low apparent specific gravity, containing not less than about 90% silica on anhydrous basis and a substantial amount of water of hydration, said active silica being formed in a heated alkaline solution capable of dissolving silica forming an active component of the active silica, and precipitated from the solution by cooling the solution.

8. The method of purifying an oil which comprises contacting the oil with a finely divided active silica of low apparent specific gravity, containing not less than about 90% silica on anhydrous basis and a substantial amount of water of hydration, said active silica being prepared by extracting, from the solid residue of acid-leached clay, silica soluble in an alkaline solution.

HERBERT J. WOLLNER.